United States Patent Office 2,867,964
Patented Jan. 13, 1959

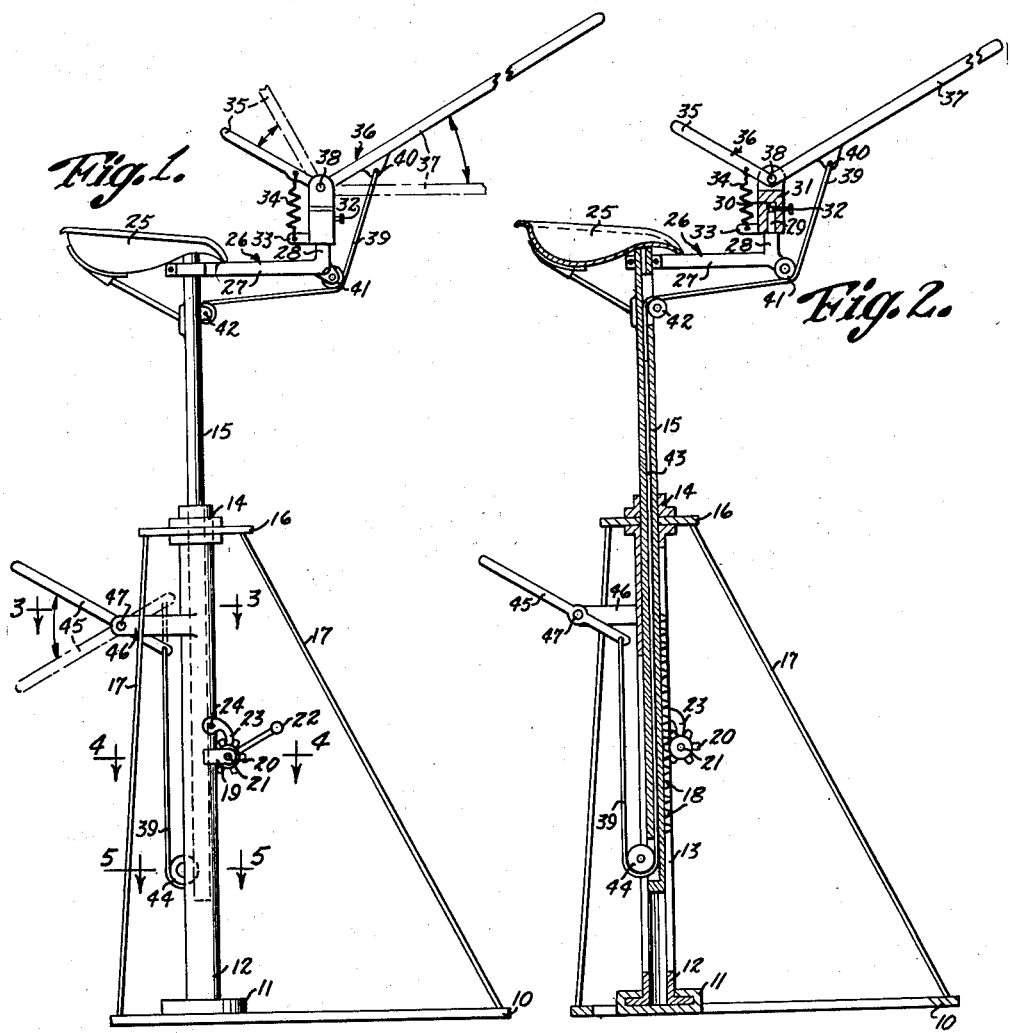
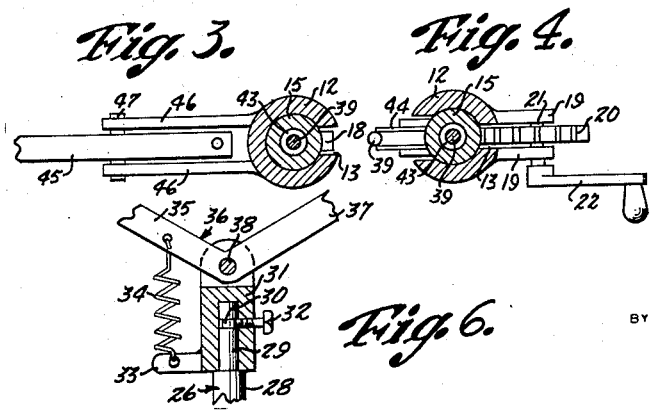

2,867,964

TREE LIMB SHAKING DEVICE

William E. Roberts, Lockhart, Tex.

Application June 26, 1957, Serial No. 668,076

2 Claims. (Cl. 56—328)

This invention relates to a harvester, and more particularly to a harvester or apparatus for use in harvesting materials from trees.

The object of the invention is to provide a harvester which will permit the user to readily cause material such as nuts to be removed from a tree.

Another object of the invention is to provide a harvester which permits a person to readily cause various materials such as nuts to be knocked or removed from a tree whereby such nuts can be readily removed from the tree without the necessity of a person climbing the tree so that the nuts or other material can be readily removed or harvested in a more convenient and safe manner.

A further object of the invention is to provide a harvester which is extremely simple and inexpensive to manufacture.

Other objects and advantages will be apparent during the course of the following description.

In the accompanying drawings, forming a part of this application, and in which like numerals are used to designate like parts throughout the same, Figure 1 is an elevational view showing the harvester of the present invention.

Figure 2 is a central vertical sectional view taken through the harvester.

Figure 3 is an enlarged sectional view taken on the line 3—3 of Figure 1.

Figure 4 is an enlarged sectional view taken on the line 4—4 of Figure 1.

Figure 5 is an enlarged sectional view taken on the line 5—5 of Figure 1.

Figure 6 is an enlarged fragmentary sectional view illustrating certain constructional details of the apparatus.

Referring in detail to the drawings, the numeral 10 indicates a horizontally disposed base which has a support member 11 mounted therein, and a vertically disposed post 12 has its lower end secured to the support member 11, Figure 2. The post 12 is provided with a longitudinally extending slot 13, and mounted adjacent the upper end of the post 12 is a body member 14 which serves to support a flange or collar 16. Braces 17 extend between the collar 16 and the base 10.

The harvester or thresher of the present invention further includes a vertically adjustable tube 15 which is slidably mounted in the post 12, and the tube 15 is provided with a plurality of spaced apart teeth 18 which register with the slot 13 in the post 12.

A manually operable means is provided for raising and lowering the tube 15 in the post 12, and this means comprises a pair of spaced apart ears 19 which extend outwardly from the post 12 and are secured thereto in any suitable manner, as for example, by welding, and the ears 19 have a shaft or pin 21 extending therebetween for supporting a gear wheel 20. A manually operable handle 22 is provided for rotating the gear wheel 20, and the gear wheel 20 is arranged in engagement with the teeth 18 on the vertically shiftable tube 15. Thus, by manually rotating the handle or crank 22 in the proper direction, the tube 15 can be raised as desired so that the effective height of the harvester can be regulated or varied as desired. A pawl or dog 23 is pivotally connected to the post 12 by means of a pivot pin 24, and the pawl 23 is adapted to selectively engage the gear wheel 20 so as to prevent accidental rotation of the gear wheel 20 whereby the tube 15 can be maintained immobile in its various adjusted position. However, when the tube 15 is to be lowered, the pawl 23 can be manually rotated in a counterclockwise direction about the pin 24 so as to permit rotation of the gear wheel 20 as when the tube 15 is being lowered.

Connected to the upper end of the tube 15 is a seat 25 which can be used as a support for a person operating the device, and also secured to the upper end of the tube 15 is a bracket 26 which includes a horizontal portion 27 and a vertical portion 28. The vertical portion 28 includes an upper shank 29 of reduced diameter, Figure 6, and the shank 29 is provided with an annular groove 30. A suitable securing element such as set screw 32 extends through a bushing 31 and into engagement with the groove 30, and extending outwardly from the lower end of the bushing 31 is a lug 33. A coil spring 34 has one end connected to the lug 33, while the other end of the coil spring 34 is connected to the section or portion 35 of a bar 36. The bar 36 further includes a section or portion 37 which is arranged angularly with respect to the portion 35, and the bar 36 is pivotally connected to the upper end of the bushing 31 through the medium of a pivot pin 38.

There is further provided a cable 39 which has its upper end connected to the portion 37 of the bar 36, as at 40, and the cable 39 is arranged in engagement with guide rollers 41 and 42, the cable 39 extending through a longitudinally extending bore 43 in the tube 15. The cable 39 is also arranged in engagement with a roller or pulley 44, and the other end of the cable 39 is connected to a manually operable lever 45. The lever 45 is pivotally connected to ears or lugs 46 by means of a pivot pin 47.

From the foregoing, it is apparent that there has been provided a device which is especially suitable for use in harvesting materials from trees or the like, and wherein such materials may be nuts such as pecans. In use, the crank 22 can be rotated whereby the gear wheel 20 will turn and this will cause adjustment of the tube 15 in the post 12 since the gear wheel 20 meshes with the teeth 18 which are on the tube 15. The dog 23 will prevent accidental rotation of the gear wheel 20 so as to maintain the tube 15 immobile in its adjusted position. After the tube 15 has been raised to the desired elevation so that the bar 36 is in the vicinity of the branches of the tree, such as the tree containing the pecans, then the operator of the device may be seated in the member or seat 25. Then, with the person seated in the support or seat 25, the portion 35 of the bar 36 can be manually gripped so that by pivoting the bar 36 on the pin 38, it will be seen that the portion 37 can be used to strike or hit the branches of the tree whereby the pecans or other material will be readily knocked from the branches. Thus, the present invention provides a means for removing nuts, fruit and the like from trees without the necessity of the person climbing the tree so that the harvester of the present invention provides a much more safe and convenient means for removing the nuts from the tree. The coil spring 34 serves to return the bar 36 to its neutral position when manual pressure is released on the handle portion 35. Due to the provision of the set screw or securing element 32 which extends in the groove 30, it will be seen that the bushing 31 is free to rotate on the shank 29 so that the bar 36 can be swung or moved to different positions whereby the nuts can be readily flailed from the branches, regardless of the position of the nuts or branches.

Furthermore, with the present invention, a person may stand on the ground and operate the device and in order to permit this operation, the lever 45 is provided. Thus, when desired, a person may stand on the ground and grip the lever 45 and move this lever 45 about the pivot pin 47 and this movement of the lever 45 causes movement of the cable 39. As the cable 39 moves, it causes pivotal movement of the bar 36 since the cable 39 is connected to the bar 36 as at 40. This movement of the bar 36 can be used to flail or harvest the nuts or other materials from branches of trees.

With the present invention, a person may be seated on the seat 25 so that such a person could be hoisted in the air whereby the device can be operated with a person on the seat 25. Instead of operating the lift by means of the hand crank 22, other means could be utilized. Thus, material such as pecans can be frailed, flailed, thrashed or whipped or beat off of trees. The pecans are adapted to be thrashed from the branches of the tree so that the dangerous job of a person climbing the tree and thrashing the nuts from the tree is eliminated.

The above description of the invention is for illustrative purposes only and it is understood that modifications may be made in the construction within the scope and spirit of the following claims.

I claim:

1. In a harvester, a base, a support member mounted in said base, a hollow post extending upwardly from said support member and provided with a longitudinally extending slot, a body member mounted on the upper end of said post, a collar extending outwardly from said body member, braces extending between said collar and base, a vertically shiftable tube slidably mounted in said post, a plurality of spaced apart teeth on said tube arranged adjacent said slot, ears extending outwardly from said post, a gear wheel rotatably supported by said ears and having teeth arranged in engagement with the teeth on said tube, a locking dog pivotally connected to said hollow post and positioned thereon for engagement with said gear wheel, a handle on said gear wheel for rotating said gear wheel, a seat connected to the upper end of said tube, a bracket extending from said tube and including a horizontally disposed portion and a vertically disposed portion, the vertically disposed portion of said bracket being provided with an upstanding shank of reduced diameter, there being an annular groove in said shank, a bushing rotatably mounted on said shank, a securing element extending through said bushing and engaging said groove, a bar pivotally connected to said bushing and including a pair of angularly arranged portions, a cable having one end connected to said bar and said cable extending through said tube, and a pivotally mounted lever connected to said cable.

2. In a harvester, a base, a support member mounted in said base, a hollow post extending upwardly from said support member and provided with a longitudinally extending slot, a body member mounted on the upper end of said post, a vertically shiftable tube slidably mounted in said post, a plurality of spaced apart teeth on said tube arranged adjacent said slot, ears extending outwardly from said post, a gear wheel rotatably supported by said ears and having teeth arranged in engagement with the teeth on said tube, a locking dog pivotally connected to said hollow post and positioned thereon for engagement with said gear wheel, a handle on said gear wheel for rotating said gear wheel, a seat connected to the upper end of said tube, a bracket extending from said tube, said bracket being provided with an upstanding shank of reduced diameter, having an annular groove therein, a bushing rotatably mounted on said shank, a securing element extending through said bushing and engaging said groove, a bar pivotally connected to said bushing, a cable having one end connected to said bar and said cable extending through said tube, and a pivotally mounted lever connected to said cable.

References Cited in the file of this patent

UNITED STATES PATENTS

| | | |
|---|---|---|
| 1,418,775 | Brown | June 6, 1922 |
| 1,623,497 | Rurup | Apr. 5, 1927 |
| 1,723,477 | Farrar | Aug. 6, 1929 |
| 2,606,078 | Brock | Aug. 5, 1952 |